Feb. 10, 1942.   W. A. DANIELSON   2,272,188

MEANS FOR REGULATING HEATING APPARATUS

Filed Nov. 22, 1940

Inventor
Wilmot A. Danielson
By Francis H. Sandermacher
Attorney

Patented Feb. 10, 1942

2,272,188

UNITED STATES PATENT OFFICE 2,272,188

MEANS FOR REGULATING HEATING APPARATUS

Wilmot A. Danielson, Quarry Heights, Canal Zone

Application November 22, 1940, Serial No. 366,615

3 Claims. (Cl. 236—9)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to a method and apparatus for the regulation and control of heating systems, but more particularly to a thermostatic control adapted to regulate a heating plant in accordance with a predetermined temperature range of the heating medium.

One object of the invention is to provide a more constant temperature for any setting of the thermostat.

Another object of this invention is to simplify the control of the furnace and avoid temperature fluctuations, by keeping the heating medium at a more constant temperature.

With these and other objects in view, this invention consists in certain novel details of construction, combination and arrangement of parts to be more particularly hereinafter described and claimed.

Although the invention described is particularly applicable to hot water heating systems with intermittent stokers or burners, it is not confined exclusively to this type, as the general principle is applicable to any form of thermal control.

In the direct control of the temperature of the heating medium, where this medium is water, as in a hot water heating system, the general principle involved in the device set forth herein consists in setting an aquastat or water thermostat by a room thermostat to thus regulate the temperaure of the area to be heated. The thermostat may be operated with or without a time switch. By thus controlling the temperature of the heating medium a relatively constant temperature, in the space controlled by the thermostat is obtained without the extreme fluctuations which usually accompany intermittent control of the fire.

Referring to the drawing in which like parts are represented by similar reference characters—

Figure 1:
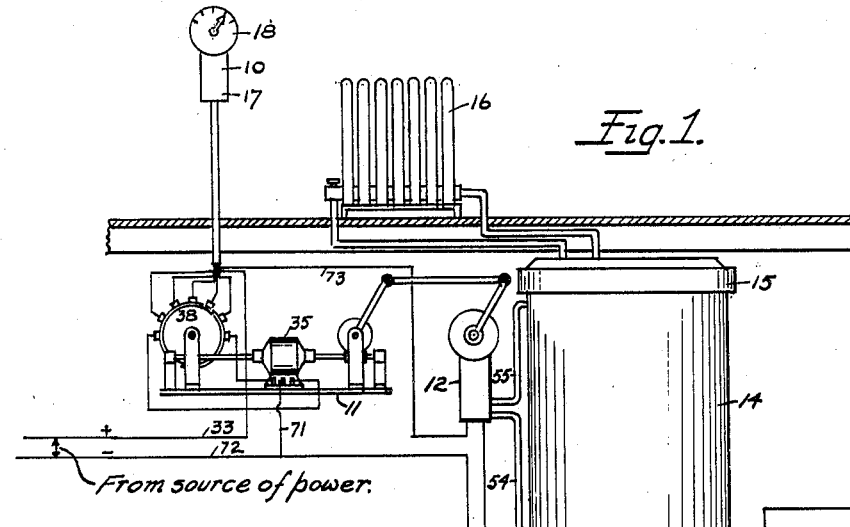
Fig. 1 is a diagrammatic view showing in elevation the general arrangement of the apparatus as installed in a house or other building.

Briefly stated, the apparatus comprises a specially constructed thermostat 10 (Fig. 1), which operates through a remote control device 11 to regulate an aquastat 12, which in turn controls the fuel feed to the furnace 15 through a fuel motor 13 and consequently the temperature of the heating medium which circulates from the boiler 14 of furnace 15 through radiator 16 to furnish any desired room temperature.

In the description which follows, the various elements of the apparatus are taken up in the order in which they operate.

Figure 2:
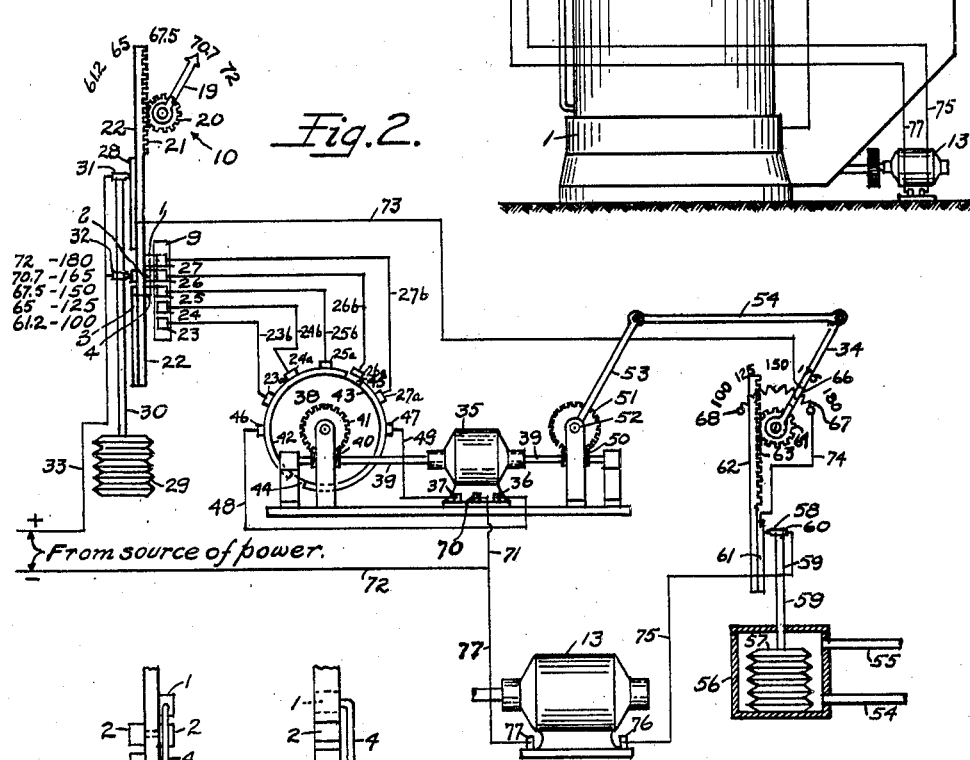
Fig. 2 is a diagrammatic view showing the general construction of the temperature control apparatus.
Figures 3, 4:
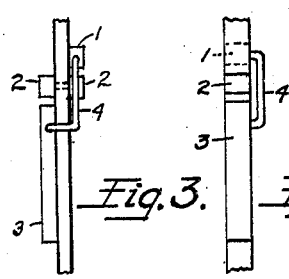
Fig. 3 is an enlarged side elevation of a portion of the bar 22, shown in Fig. 2, illustrating in detail the arrangement of the contact members attached thereto.
Fig. 4 is a front elevation of the portion of bar 22, shown in Fig. 3.

The thermostat 10 (see Fig. 2), which is responsive to the room temperature, comprises a casing 17 in which is mounted a dial 18, a setting hand 19, rotatably mounted at the center of said dial, and a pinion 20 attached to said setting hand, which meshes with a rack 21 on a vertically adjustable bar 22 made of insulating material. The lower portion of the bar 22 is provided with contact members 1, 2 and 3, as shown in Figs. 2, 3 and 4, which function in relation with a series of stationary contacts 23, 24, 25, 26 and 27, and a movable contact brush 32. The upper contact member 1 is adapted to make contact only with the stationary contacts 23, 24, 25, 26 and 27, whereas the lower contact member 3 makes contact only with the movable brush 32. Contact member 1 and contact member 3 are conductively united by an insulated connecting wire 4. The middle contact member 2 projects from opposite sides of the bar 22 and is adapted to make contact with any of the stationary contacts 23, 24, 25, 26 and 27, and the brush 32. The upper portion of the rod 22 is provided with a single elongated contact member 28 which is connected through a conductor to a contact on the aquastat.

In the lower portion of the thermostat casing is located a bellows 29 containing a thermosensitive fluid which causes the bellows to expand and contract with heat changes in the surrounding air. On the top of the bellows 29 is mounted a rod 30 made of insulating material on which are attached a flexible brush contact member 31 and also the brush contact 32 mentioned above. Each of these contact members is connected to a conductor 33 on the positive side of the line. The upper flexible member 31 is adapted to contact the surface of the elongated contact element 28 and the lower flexible member 32 is adapted to contact the surfaces of contact members 2 and 3 on the bar 22.

From Fig. 2, it will be seen that the thermostat is so constructed that when the indicator arm 19 is turned to any desired temperature indication it sets the vertically adjustable bar 22, so that the sliding contact brush 31, which is raised by the bellows 29, will override its contact member 28 when it passes beyond the temperature set on the dial, and by so doing will cut off the current to the fuel motor. It will also be noticed from Fig. 2 that for any cooling of the surrounding air the bellows 29 will contract and move the brush 32 downward to the contact 3. This downward movement will increase the fuel feed and thus bring the room back to the temperature desired, as will be described further.

The remote control apparatus comprises a step-by-step mechanism for imparting a movement to the control arm 34 of the aquastat 12 corresponding to that of the indicator hand 19 of the thermostat. This apparatus is provided with a motor 35 having binding posts 36 and 37, which are connected with motor fields (not shown), either of which may be placed in circuit to drive the motor in a clockwise or counterclockwise direction.

This step-by-step mechanism 11, which is controlled by the thermostat 10 and which operates the aquastat 12, comprises a controller disc 38 formed of insulating material which is rotated by the motor 35 through the shaft 39 and appropriate gears 40 and 41. On the disc 38 are mounted annular contact members 42 and 43. These annular contacts 42 and 43 are separated from each other at their extremities by air spaces designated by the numerals 44 and 45.

Cooperating with the annular contacts 42 and 43 are a plurality of brushes 23a, 24a, 25a, 26a and 27a, connected respectively by conductors 23b, 24b, 25b, 26b and 27b, with the contacts 23, 24, 25, 26 and 27, aligned vertically on insulating bar 9, which is attached to the casing of the thermostat. Field brushes 46 and 47 are connected respectively through conductors 48 and 49 to fields (not shown) of the motor 35. All of these brushes 23a, 24a, 25a, 26a, 27a, 46 and 47 are of less width than the air spaces 44 and 45 between the annular contacts 42 and 43, consequently when either of said insulating spaces 44 and 45 arrives opposite any of the brushes 23a, 24a, 25a, 26a and 27a, the circuit through the particular brush will be broken. The field brushes 46 and 47 connect the annular contacts 42 and 43 to the binding posts 36 and 37 of the motor fields (not shown).

The other end of the motor shaft is connected through the worm 50 and gear 51 for rotative movement of a shaft 52 provided with an arm 53. The arm 53 is connected through a link 54 to the setting arm 34 of the aquastat 12.

The aquastat or boiler thermostat 12 is connected to the boiler through the tubing 54 and 55 by which the heating medium or water of the boiler passes through a chamber 56 to transmit its temperature to the bellows 57 contained therein (see Fig. 2). This bellows member is filled with a thermo-sensitive expansible fluid of any desired character, the pressure changes of which in response to temperature variations in the heating medium are utilized for regulating the actuation of the cut-off switch 58. This switch comprises a contact brush 60, which is attached to the upper extremity of an upright 59 made of insulating material which is attached to the top of bellows 57. The brush 60 is adapted to make a sliding contact with an elongated contact member 61 on the adjustable bar member 62. This bar member 62, which is made of insulating material, is provided with a rack 63, which meshes with a pinion 64, the latter being connected to the control crank arm 34. The crank arm 34 provides a means for setting the boiler thermostat or aquastat 12, since the turning of this arm 34 to a predetermined point determines the temperature at which the contact member 60 will override the surface of the elongated contact member 61, and thus break a circuit to the stoker or fuel motor 13, as will be explained further in a description of the circuits.

The aquastat control arm 34 is provided with an insulated contact member 66, which, in conjunction with the resistance coil 67 on which it makes slidable contact, forms a rheostat 68. This rheostat 68, which is connected in the power line, serves to control the speed of the fuel motor 13 relative to the setting of the control arm 34. The control arm 34 of the aquastat 12 is set with the setting of the room thermostat 10 by the remote control apparatus 11, which turns the control arm 34 of the aquastat corresponding to the turning of the indicator hand 19 of the room thermostat. By thus simultaneously adjusting the thermostat and the aquastat the temperature of the heating medium may be regulated to a temperature required to produce the desired temperature indicated by the setting on the room thermostat. The circuits connecting the source of power to the room thermostat and to the remote control mechanism, and also connecting the source of power with the thermostat, aquastat and fuel motor, are as follows: Tracing first the circuit from the source of power to the thermostat and to the remote control apparatus, current passes from the positive side of the line through conductor 33 to flexible brush contact 32 within the thermostat, the height of which depends on the degree of expansion of the temperature responsive bellows 29. It will be seen from Fig. 2 that current may pass from contact 32 to either of the contacts 3 or 2 of the group 1, 2 and 3, on the bar 22. If the bellows 29 is expanding the brush 32 will move along the elongated contact member 3 and the current will pass from contact 3 to contact 1 through the conductor 4. When the contact brush 32 passes above the elongated contact member 3, it will come in contact with the contact member 2 which passes through the bar 22 and projects as a contact on the other side thereof.

Current from the conductively connected contacts 3 and 1, or contact 2, may pass to any of the contacts 23, 24, 25, 26 and 27 on the bar 22, depending on the relative positions of the bar 22 which is set by the thermostat hand 19, and the contact brush 32 which is raised and lowered by the temperature responsive bellows 29. From either of the contacts 1 or 2 current will pass to one of the stationary contacts of the group 23, 24, 25, 26 and 27. These latter contacts 23, 24, 25, 26 and 27, which are arranged vertically to agree with heights of the brush 32 over a predetermined temperature range, are each connected respectively through conductors 23b, 24b, 25b, 26b or 27b, to a contact of the group 23a, 24a, 25a, 26a and 27a, which are equally spaced around the upper edge of the diameter of the disc 38, so that they contact the surfaces of the annular contact members 42 and 43. From the contact member of this latter group which is receiving current from the brush member 32, current passes through either of the annular contact members 42 or 43 to one of the brush contacts 46 or 47, and hence to one of the motor fields (not shown), through conductor 48 and binding post 36, or conductor 49 and binding post 37. The negative post 70 of the motor 35 is connected to the negative side of the line through the conductors 71 and 72.

Tracing the circuit from the source of power to the thermostat, aquastat, and fuel motor, current is transmitted from the positive side of the line from the source of power through conductor 33 and brush contact 31 to contact strip 28, then through conductor 73 to the contact 66 on the control arm 34 of the aquastat. From here it passes through the resistance coil 67, to the conductor 74, to elongated contact plate 61, thence to cut-off switch 58, and then through conductor 75 to terminal 76 of fuel motor 13. To complete the circuit the other terminal 77 of the fuel motor 13 is connected to the negative side of the line through the conductors 71 and 72.

The contact strips 28 of the thermostat, and 61 of the aquastat are overridden by the slidable contact brushes 31 or 60 when either of these brushes is raised above the uppermost extremities thereof by the expansion of the heat responsive bellows 29 or 57. The heights of the upper extremities of the contact member 31 and the contact member 61 are set respectively by the dial hand 19 of the thermostat and the control arm 34 of the aquastat at predetermined temperature settings relative to the expansion of the bellows 29 and 57, of the thermostat and aquastat.

Before describing the operation of the device, it should be noted that only five settings are shown on the thermostat. This small number of settings is shown to simplify the description of the construction and operation of the device, and it is therefore to be understood that any number of settings can be incorporated in the thermostat construction to function through a corresponding number of step-by-step operations of the remote control apparatus to give a corresponding setting of the aquastat.

To illustrate the operation of the apparatus, it will be supposed that the thermostat indicator hand is on the position shown, that is, at 70.7° F. and that the brush 32 is on contact 2 of the adjusting bar 22. Then contact 2 is touching stationary contact 26 and the motor 30 is at rest as no current can flow to its fields (not shown), since the contact 26a is in its off position, that is, in a space between the arcuate contact members 42 and 43. If, however, the indicator hand 19 of the thermostat is moved to 67.5° F., so that the contact 2 touches the contact member 25, then the circuit through the brush 31 and contact 28 will be broken, cutting off current to the fuel motor 13. The room will consequently cool and the bellows 29 contracts, moving the brush 32 downward until it again touches the contact 2, which allows a circuit to be completed from the positive side of the line through conductors 33, brush 32, contact 2 to contact 25, conductor 25b, brush 25a, arcuate contact member 42, brush 46, and conductor 48 to the binding post 36 of the motor 30, and thence to one of the fields thereof. From this field the current flows to the negative side of the line through binding post 70 and conductors 71 and 72. This circuit will cause the motor 35 to rotate the controller disc 38 and annular contacts 42 and 43, which are attached thereto in a counterclockwise direction until the insulating space 45 is opposite the brush 25a, whereupon the circuit is broken and the motor stopped. Since the motor is coupled through gears 50 and 51 to the arcuately movable arm 53, said motor during the period of its operation, will move arm 53 in a counterclockwise direction and in so doing will transmit a similar movement to the arm 34 of the aquastat to which it is connected by the link 54, thus setting the aquastat for a water temperature of 150° F., where under ordinary conditions of outside temperature, it will remain until it is desired to change the room temperature by resetting the dial hand 19.

It will be noted that when the brush 32 is moved down opposite the contact 2, the brush 31 also is moved down with it, until it comes in contact with the elongated contact plate 28, thus allowing current to pass to the fuel motor 13, the speed of which was regulated through the operation of the aquastat through the remote control apparatus.

Suppose at this setting there is a sudden cooling of the room in which the thermostat is located, then the brush contact will drop from its position of contact with the contact member 2, and come in contact with the elongated contact member 3. In this position current will pass from brush 32 to contact member 3, through conductor 4 to contact member 1, and hence to stationary contact 26. The fuel motor will be speeded up to raise the temperature of the heating medium until the room is sufficiently warm for the bellows 29 to elevate the brush 32 until it reaches contact member 2 which touches contact member 25, the setting originally intended. Thus, any cooling of the room or house operates through the thermostat to effect the production of increased heat to bring back the temperature to the thermostat setting as rapidly as possible.

To illustrate what occurs when the thermostat arm is moved in a clockwise direction, it will be assumed that the arm has been moved back to 70.7° F. Under these circumstances current will pass from the positive side of the line through conductor 33, brush 32, to elongated contact 3 and through conductor 4 to contact 1, which touches contact 27. It will be noted that contact 27 is one contact above the one which will hold the temperature of the room or house at 70.7° F. This contact is connected through the remote control apparatus to so regulate the aquastat so that a room temperature of 72° F. will be reached. Thus with the fuel motor set for a temperature of 72° F. the bellows will move the contact 32 upward and off of contact 3 and onto contact 2, so that the circuit through contact 27 will be broken and the current through contact 26 established.

In tracing the circuit from the contact 27, it will be noted that current will pass through the conductor 27b to contact 27a, then through arcuate contact 43 to brush 47. From brush 47 current passes through conductor 49 to binding post 37 of motor 35, and thence through the other field (not shown). From this latter field the current flows to the negative side of the line through binding post 70 and conductors 71 and 72. This circuit will cause the motor 35 to rotate the controller disc 38 in a clockwise direction until the insulating space 45 is opposite the brush 27a, whereupon the circuit is broken and the motor 35 stopped. This setting of the disc 38 remains until the brush 32 is raised, by the increasing temperature of the room, above the contact 3 and onto contact 2, when the disc 38 will be rotated in a counterclockwise direction until the air gap 45 moves opposite the contact 26, which is the setting desired.

This application is a continuation-in-part of my application, Serial No. 164,844, filed September 21, 1937.

Having described my invention, what I claim as new and wish to secure by Letters Patent, is—

1. An electrically operated thermal control apparatus including a fuel feeding motor, an aquastat adapted to control the operation of said fuel feeding motor, a thermostat provided with a temperature graduated dial, and a setting hand adapted to regulate the temperature setting of said thermostat to thereby effect a corresponding setting of the aquastat through a remote control apparatus, including a reversible motor coupled to a controller, said thermostat including a series of vertically aligned stationary contact terminals, corresponding to temperature graduations of the dial and provided with circuit connections to the controller of said remote control apparatus, a vertically adjustable contact bar operatively connected with said setting hand and provided with upper and lower contact strips, an intermediate contact member adapted to contact a selected terminal of said series, corresponding to a given temperature setting, and an additional contact member conductively connected to the lower contact strip adapted to contact a terminal above said selected terminal on the bar, corresponding to a higher temperature setting; a thermally actuated vertically movable rod provided with brushes adapted to contact said contact strips and said intermediate contact to complete circuits to said remote control apparatus through said selected terminal of the series, and to complete a circuit through a terminal above the same, corresponding to a higher temperature setting of the aquastat and thereby effect a temperature rise sufficient to elevate the thermally actuated rod to a position whereby a circuit will be completed through the selected terminal of the control series to effect a corresponding temperature setting of the aquastat for the given temperature setting of the thermostat.

2. An electrically operated thermal control apparatus for effecting a predetermined temperature range of a heating medium including a fuel feeding motor, an aquastat adapted to control the operation of said fuel feeding motor, and a thermostat provided with a temperature graduated dial, and a setting hand adapted to regulate the temperature setting thereof to thereby effect a corresponding temperature setting of said aquastat through a remote control apparatus, including a controller driven by a reversible motor, said thermostat including a series of vertically aligned stationary contact terminals, corresponding to temperature graduations of the dial and provided with circuit connections to the controller of said remote control apparatus, a thermally actuated vertically movable rod provided with brushes arranged parallel to said series of stationary contact terminals and a vertically movable contact bar actuated by said setting hand positioned intermediate said rod and said terminals adapted to complete circuits to said remote control apparatus to thereby regulate the aquastat to effect temperature control of the heating medium and thus render a predetermined air temperature in the vicinity of the thermostat.

3. An electrically operated thermal control apparatus including a fuel feeding motor, an aquastat adapted to control the operation of said fuel feeding motor, and a thermostat adapted to control said aquastat through a remote control apparatus, including a reversible motor coupled to a controller and to said aquastat, said thermostat including a series of vertically aligned stationary contact terminals, provided with circuit connections to said remote control apparatus, a vertically adjustable contact member provided with upper and lower strip contacts, an intermediate contact, adapted to contact a terminal of said series and an additional contact conductively connected to the lower strip and adapted to contact a terminal above the terminal contacted by said intermediate contact, and a thermally actuated vertically movable rod provided with brushes adapted to contact said contact strips and said intermediate contact on said bar to complete circuits to said remote control apparatus through a predetermined terminal of the series and to complete a circuit through a terminal of said series above the aforementioned contact to effect a temperature rise sufficient to elevate the intermediate contact to a position whereby a circuit will be completed to the selected terminal of the control series.

WILMOT A. DANIELSON.